United States Patent [19]

Grenci et al.

[11] Patent Number: 5,366,358

[45] Date of Patent: Nov. 22, 1994

[54] OIL FREE SCROLL VACUUM PUMP

[76] Inventors: Charles A. Grenci, 205 Brown Rd., Montrose, Colo. 81401; R. Dallas Clayton, 200 Altez SE., Albuquerque, N. Mex. 87123

[21] Appl. No.: 9,851

[22] Filed: Jan. 27, 1993

[51] Int. Cl.$^5$ .................. F04C 18/04; F04C 27/00; F16J 15/02; F16J 15/48

[52] U.S. Cl. ..................... 418/55.4; 277/27; 277/96.1

[58] Field of Search ............... 418/55.4, 149, 55.1; 277/27, 96, 96.1, 165, 205

[56] References Cited

U.S. PATENT DOCUMENTS

| | | | |
|---|---|---|---|
| 3,994,633 | 11/1976 | Shaffer | 418/55.4 |
| 4,192,152 | 3/1980 | Armstrong et al. | 418/55.4 |
| 4,199,308 | 4/1980 | McCullough | 418/55.4 |
| 4,883,413 | 11/1989 | Perevuznik et al. | 418/55.4 |
| 5,129,798 | 7/1992 | Crum et al. | 418/55.4 |

FOREIGN PATENT DOCUMENTS

| | | | |
|---|---|---|---|
| 55-64180 | 5/1980 | Japan | 418/55.4 |
| 2275084 | 11/1990 | Japan | 418/55.4 |

Primary Examiner—John J. Vrablik
Attorney, Agent, or Firm—Milton S. Gerstein; Marvin Benn

[57] ABSTRACT

The invention relates specifically to a simplified and subsequently improved method to produce a scroll type vacuum pump that is capable of achieving vacuum pressures below 1 torr through the placement of at least one dynamic orbital vacuum seal between the two scroll halves at the outside diameter of the scroll spirals to prevent atmospheric gas from entering. Prior to this invention, in order to achieve vacuum pressures less than 1 torr with a scroll pump it has been necessary to either seal the two scroll halves with a large diameter metal bellows that accommodates the required orbital travel or to locate the orbiting scroll plate or plates and the components that convert the rotary drive to the required orbital motion inside the vacuum space with a dynamic vacuum seal on the rotary drive shaft. Both of these designs have been expensive to produce, limiting the application of scroll technology in the vacuum industry to special applications.

8 Claims, 12 Drawing Sheets

OIL FREE SCROLL VACUUM PUMP

BACKGROUND OF THE INVENTION

1. Field of the Invention (Technical Field).

The invention relates specifically to a simplified and subsequently improved method to produce an oil free scroll type vacuum pump which is capable of achieving vacuum pressures below 1 torr through the application of the invention's dynamic orbital vacuum seal between the opposing scroll halves in order to prevent atmospheric pressure from entering into the pump.

2. Background Art

Scroll type vacuum pumps are pumps that consist of two plate halves which have involute archimedes spiral walls formed into each plate half. The plates are placed together with the spirals interleaved. An orbiting motion is employed to either or both plates in order to trap a volume of gas from the outside diameter of the scroll spiral walls and then compress the gas along the spiral walls in a crescent shaped chamber that becomes smaller until the gas is expelled to atmosphere at the outlet port located at the center of the spiral walls. In order to achieve vacuum pressure less than 1 torr, it has previously been necessary to seal the orbiting outside diameter mating joint between the two scroll halves with a large diameter bellows. This bellows is welded to each scroll half in a configuration that can accommodate the required orbital travel and prevent atmospheric pressure from entering the pump. Another method locates one or both scroll plates, along with the components that convert the rotary drive to the required orbital motion, inside the vacuum space. Both of these designs are more expensive to produce than the invention's improved scroll vacuum pump which utilizes the invention's dynamic orbital vacuum seal to seal the orbiting outside diameter mating joint between the scroll halves. This expense has limited the application of scroll technology in the vacuum industry to special applications.

SUMMARY OF THE INVENTION

It has been found that an economical oil free scroll vacuum pump capable of vacuum pressures below 1 torr can be produced utilizing the discovery that it is possible to create a dynamic orbital vacuum seal at the orbiting outside diameter mating joint between the two scroll halves as one or both halves travel in the orbital motion required to trap a volume of gas at the outside diameter of the scroll spiral walls and compress it along the spiral walls in a crescent shaped chamber which becomes smaller until the gas is expelled at the outlet port located at the center of the spiral walls. This discovery eliminates the requirement of an expensive metal bellows seal between the scroll halves as a seal against atmosphere or the complex placement of the orbiting scroll components inside the process vacuum space. These savings make the invention's improved oil free scroll vacuum pump design economical to produce with greater potential application within the vacuum industry.

BRIEF DESCRIPTION OF THE DRAWINGS

The accompanying drawings, which are incorporated into and form a part of the specification, illustrate the preferred embodiment of the invention and, subsequently, are not to be construed as limiting the invention.

DESCRIPTION OF THE PREFERRED EMBODIMENTS

Figure 1:
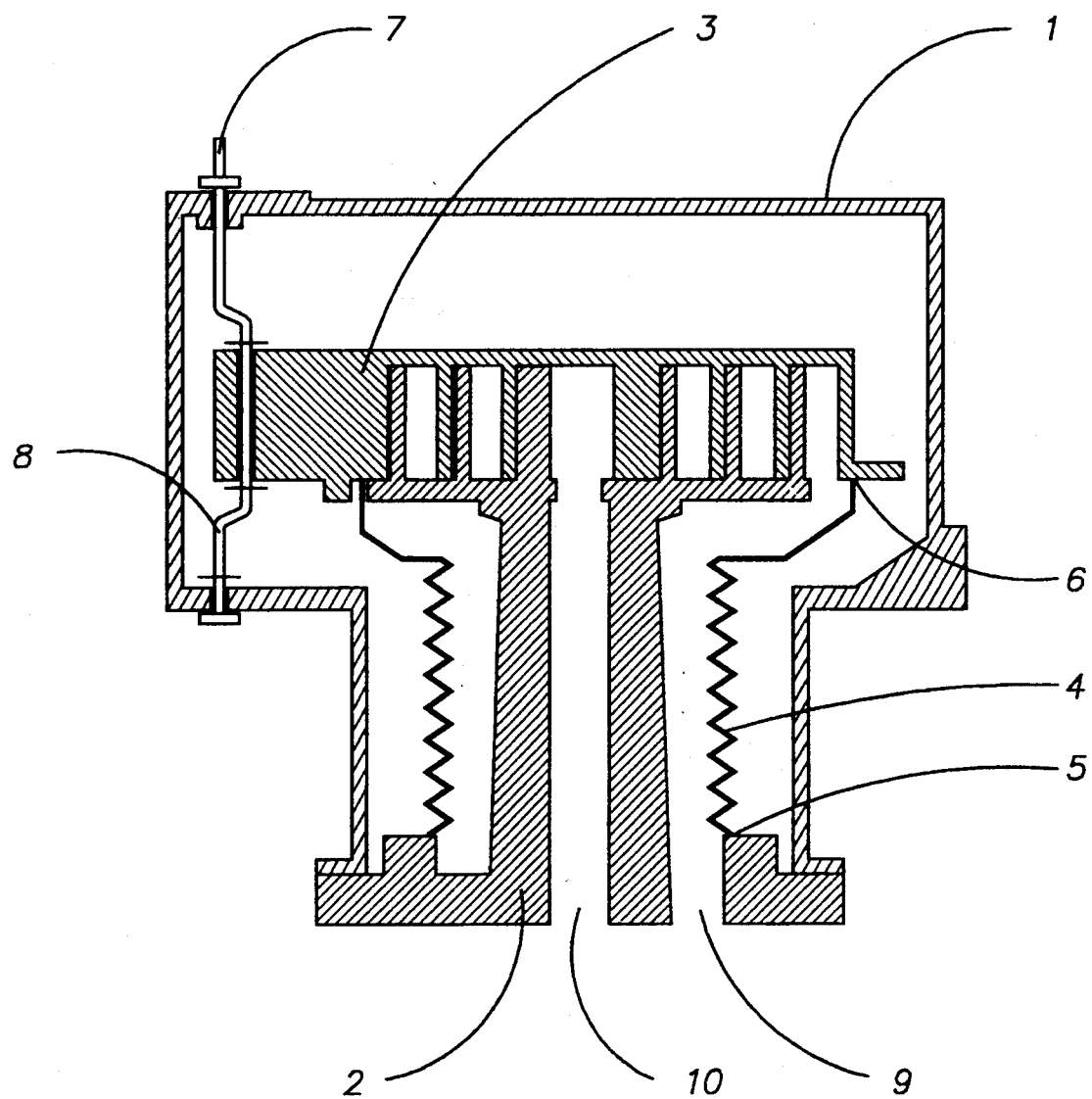
FIG. 1 is a cross-sectional plan view of a prior art, bellows type scroll vacuum pump.

Referring to FIG. 1, a prior art bellows type scroll vacuum pump 1 is shown: with a bellows type fixed scroll half 2 and a bellows type orbiting scroll half 3. This type of scroll pump incorporates a nutating bellows 4 with a welded bellows connection to fixed scroll half 5 and a welded bellows connection to orbiting scroll half 6 as a vacuum seal against atmospheric pressure. The bellows is of sufficient length to reliably accommodate the orbital motion that is imparted to the bellows type orbiting scroll half 3 by a bellows type rotary drive shaft 7 connected to a bellows type orbital drive crank shaft 8. The bellows insures that the bellows type scroll pump inlet 9 is the sole point of entry for gas that will be compressed by the pump and expelled through the bellows type scroll pump exhaust 10.

Figure 2:
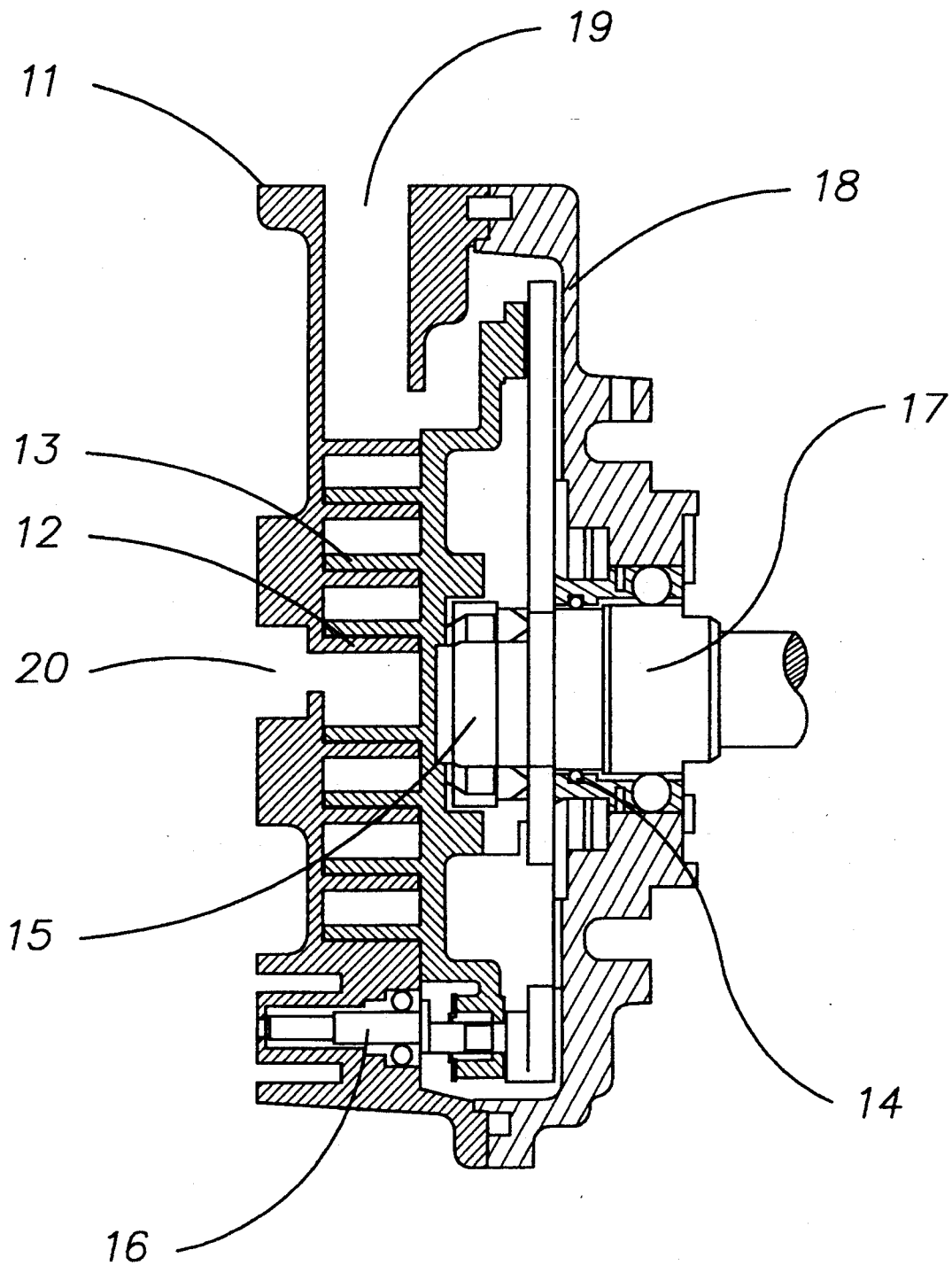
FIG. 2 is a cross-sectional elevation side view of a prior art, enclosed orbiting scroll type vacuum pump.

Referring to FIG. 2, a prior art enclosed orbiting scroll type vacuum pump 11 is shown. This type of scroll pump has an enclosed type fixed scroll 12 that incorporates a process vacuum orbiting scroll assembly vacuum cover 18 that encases the enclosed type orbiting scroll 13, the enclosed type orbital drive crank shaft 15, the idler crank bearing assembly 16 and other associated mechanisms that convert the rotary motion of the enclosed type rotary drive shaft 17 to the orbital motion that scroll type pumps require to compress and expel gas. A dynamic rotary vacuum seal 14 and several static seals insure that the sole point of entry for gas into the pump is through the enclosed type scroll pump process vacuum inlet 19. The gas is then compressed and expelled through the enclosed type scroll pump outlet 20.

Figure 3:
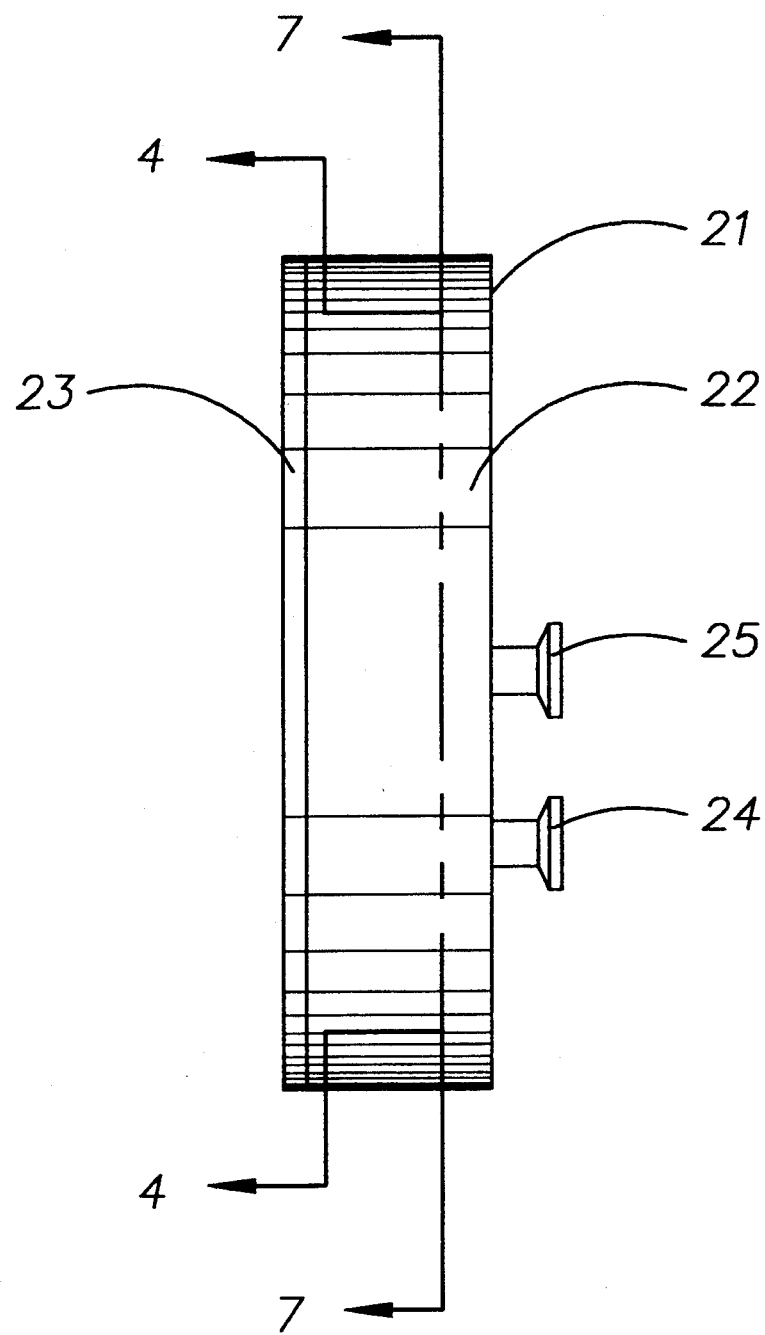
FIG. 3 is a side elevation view of the invention's oil free scroll vacuum pump.

Referring to FIG. 3, an improved oil free scroll vacuum pump 21 is shown with a fixed scroll half 22, an orbiting scroll half 23, a scroll pump inlet location 24, and a scroll pump exhaust location 25 to illustrate the major components of the invention.

Figure 4:
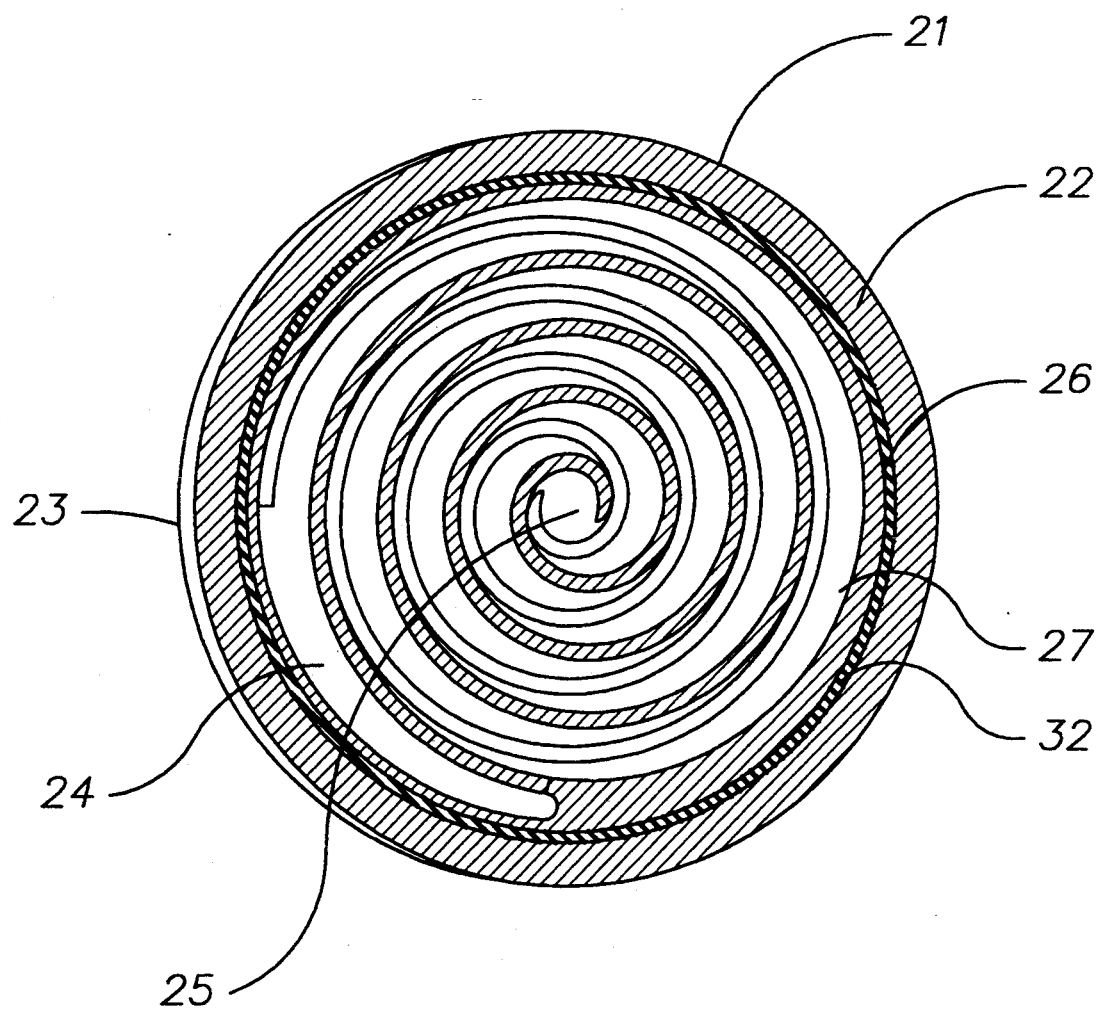
FIG. 4 is a cross-sectional front elevation view taken on line 4—4 of FIG. 3 that shows the orientation of the interleaved scroll spiral walls when the primary gas volume is trapped in the primary crescent shaped chamber that is formed when the example orbiting scroll half is in the left most position of its orbital travel.

Referring to FIG. 4, a cross section of the improved oil free scroll vacuum pump 21 in FIG. 3 is shown with the orbiting scroll half 23 in the left most position of its orbital travel in relation to the fixed scroll half 22. The fixed scroll half 22 has been cross sectioned to show the location of a dynamic orbital vacuum seal 32 that is positioned within a dynamic orbital vacuum seal groove 26 and to show the orientation of the interleaved fixed scroll half 22 spiral walls and the orbiting scroll haft 23 spiral walls when the first volume of gas is isolated from the scroll pump inlet location 24 in the primary crescent shaped gas compression chamber 27. The volume of gas will be compressed along the spiral walls in the primary crescent shaped gas compression chamber 27 that becomes smaller with each orbital rotation of the orbiting scroll half 23 until the gas volume is expelled through the scroll pump exhaust location 25 at the center of the fixed scroll half 22 spiral.

Figure 5:
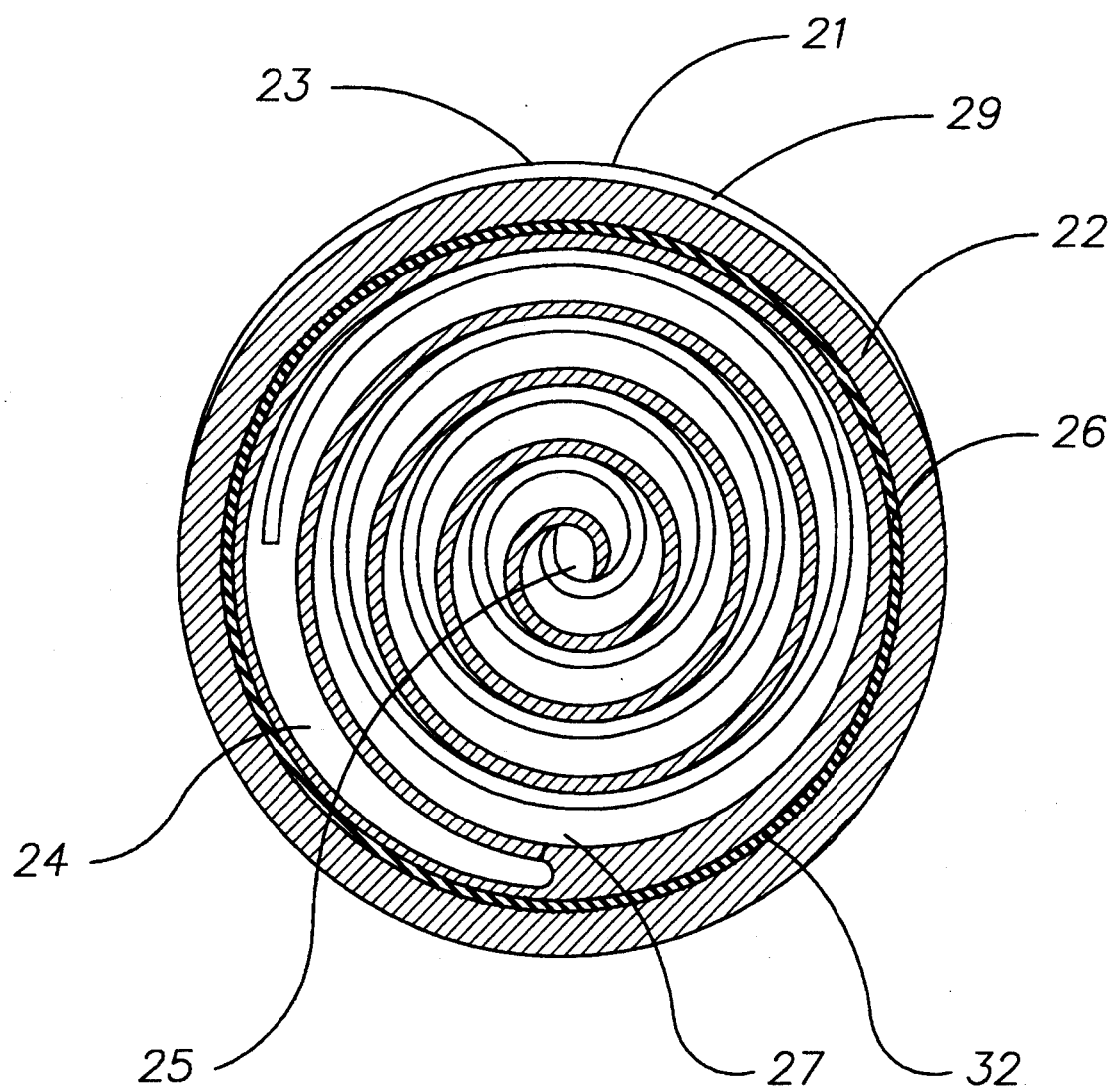
FIG. 5 is a moved position of FIG. 4 that shows the orientation of the interleaved scroll spiral walls when the primary trapped gas volume has been compressed and moved along the spiral walls from the right side of the spiral walls outside diameter to the bottom spiral outside diameter when the example orbiting scroll half is in the top most position of its orbital travel.

Referring to FIG. 5, the cross section of the improved oil free scroll vacuum pump 21 in FIG. 3 is shown with the orbiting scroll half 23 moved to the top most position of its orbital travel in relation to the fixed scroll half 22. The orientation of the interleaved fixed scroll half 22 spiral walls and the orbiting scroll half 23 spiral walls in this position have further compressed the gas that is trapped in the primary crescent shaped gas compression chamber 27 towards the scroll pump exhaust location 25 at the center of the fixed scroll half 22 spiral where the gas volume will be expelled. The orbiting scroll half vacuum seal contact surface 29 of the orbiting scroll half 23 does not travel across the boundary formed by the outside diameter of the dynamic orbital vacuum seal groove 26 which allows the dynamic orbital vacuum seal 32 to maintain contact with the orbiting scroll half vacuum seat contact surface 29 to prevent atmospheric pressure from entering the improved oil free scroll vacuum pump 21.

Figure 6:
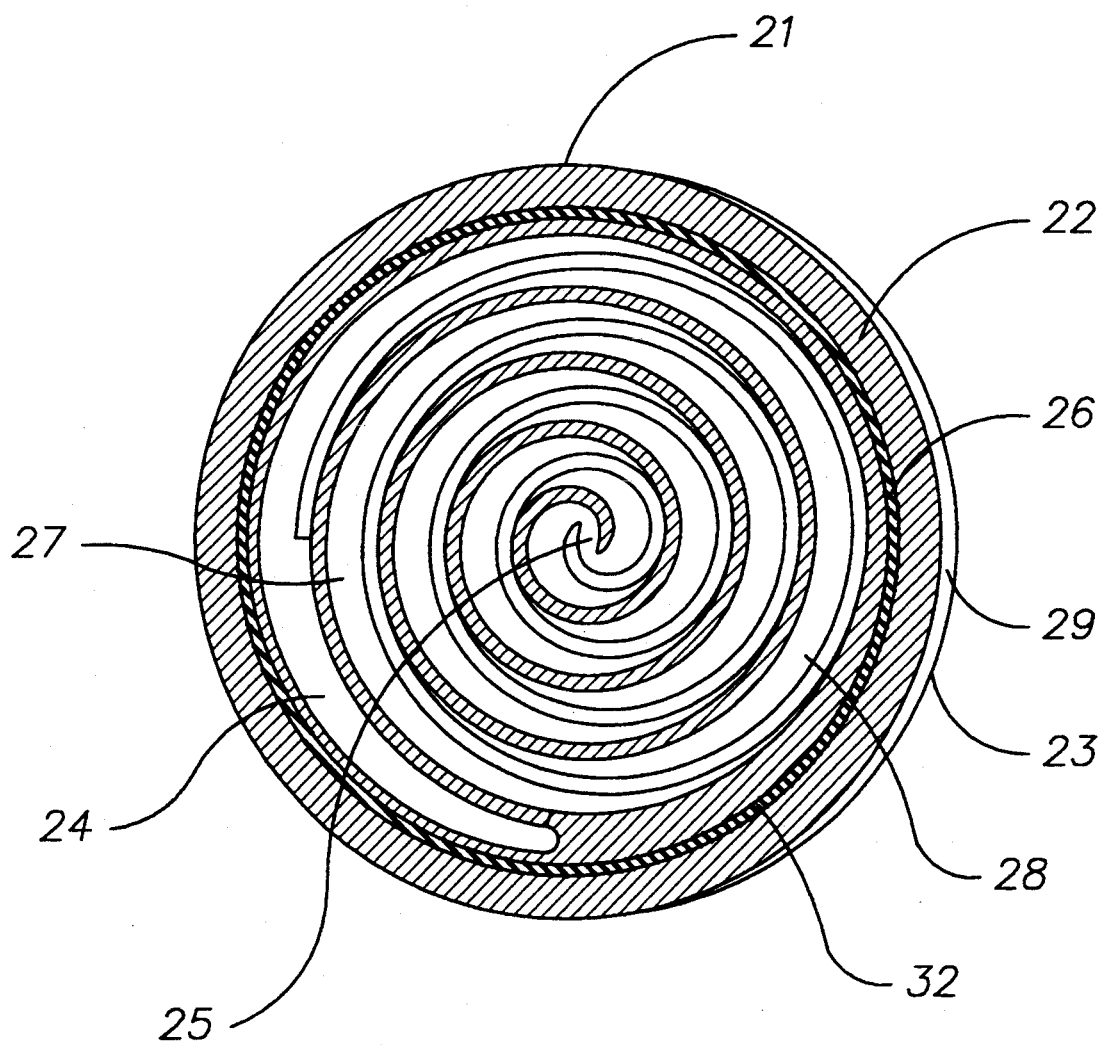
FIG. 6 is a moved position of FIG. 4 that shows the orientation of the interleaved scroll spiral walls when the primary trapped gas volume has been further compressed by moving further into the scroll spiral and a secondary gas volume is trapped in the secondary crescent shaped chamber which is now opposite the primary crescent shaped compression chamber when the example orbiting scroll half is in the right most position of its orbital travel.

Referring to FIG. 6, the cross section of the improved oil free scroll vacuum pump 21 in FIG. 3 is shown with the orbiting scroll half 23 moved to the right most position of its orbital travel in relation to the fixed scroll half 22. The orientation of the interleaved fixed scroll half 22 spiral walls and the orbiting scroll half 23 spiral walls in this position have further compressed the gas that is trapped in the primary crescent shaped gas compression chamber 27 and isolated a second volume of gas from the scroll pump inlet location 24 in a secondary crescent shaped gas compression chamber 28 that will be compressed with the primary crescent shaped gas compression chamber 27 towards the scroll pump exhaust location 25 at the center of the fixed scroll half 22 spiral where both gas volumes will be expelled. The orbiting scroll half vacuum seal contact surface 29 of the orbiting scroll half 23 does not travel across the boundary formed by the outside diameter of the dynamic orbital vacuum seal groove 26 which allows the dynamic orbital vacuum seal 32 to maintain contact with the orbiting scroll half vacuum seal contact surface 29 to prevent atmospheric pressure from entering the scroll pump inlet location 24, the secondary crescent shaped gas compression chamber 28 or the primary crescent shaped gas compression chamber 27. This allows the improved oil free scroll vacuum pump 21 to achieve vacuum pressures as low as $5 \times 10^{-3}$ torr.

Figure 7:
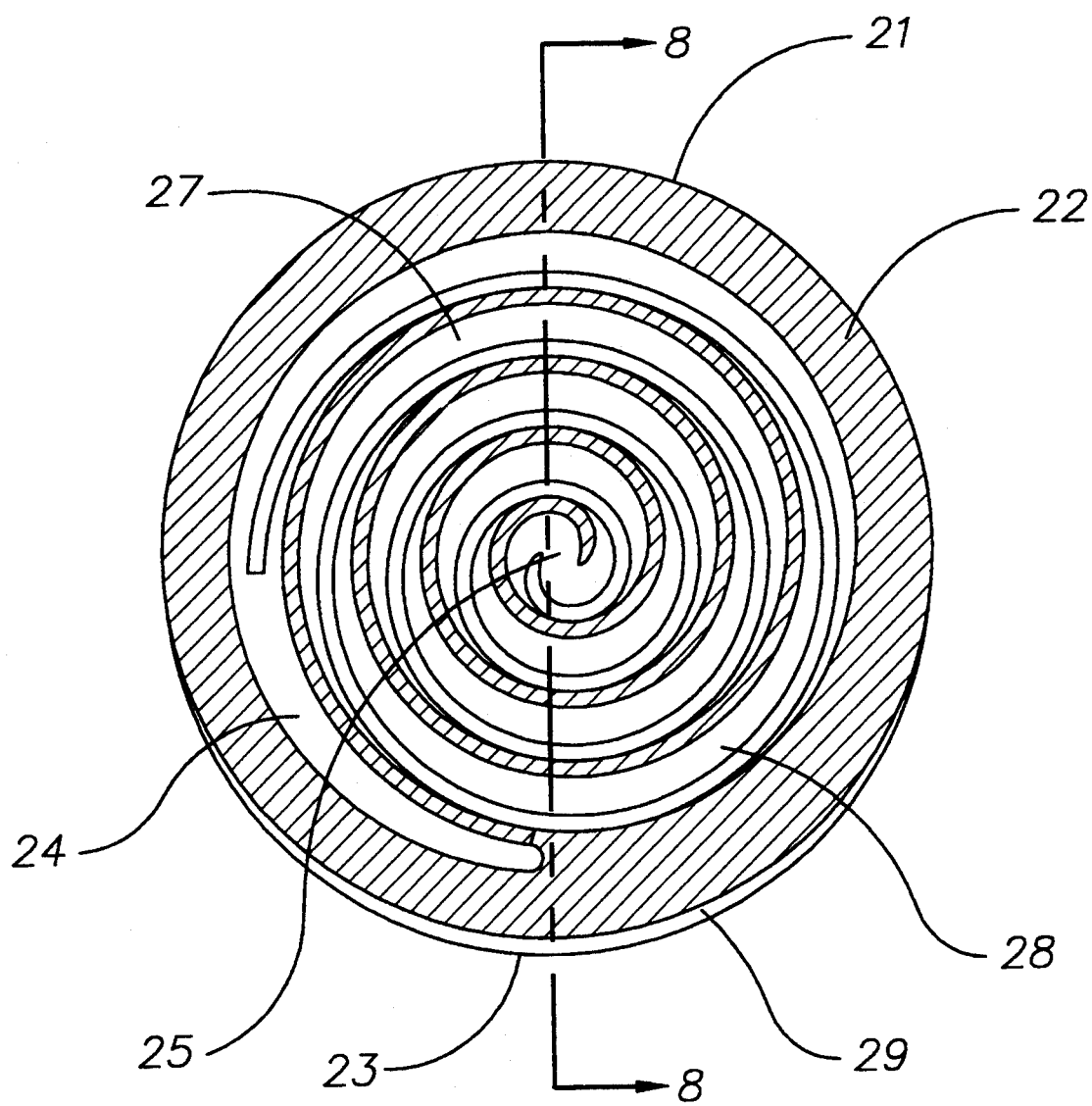
FIG. 7 is a cross sectional front elevation view taken on line 7—7 of FIG. 3 that shows the orientation of the interleaved scroll spiral walls when both the primary and secondary gas volumes that are trapped in the primary and secondary crescent shaped chambers have been further compressed by moving further into the scroll spiral towards the center of the scroll spiral walls where both the primary and secondary gas volumes will be expelled through the scroll pump outlet.

Referring to FIG. 7, the cross section of the improved oil free scroll vacuum pump 21 in FIG. 3 is shown with the orbiting scroll half 23 moved to the bottom most position of its orbital travel in relation to the fixed scroll half 22. The orientation of the interleaved fixed scroll half 22 spiral walls and the orbiting scroll half 23 spiral walls in this position have further compressed the gas that is trapped in the primary crescent shaped gas compression chamber 27 and the gas that is trapped in the secondary crescent shaped gas compression chamber 28 towards the scroll pump exhaust location 25 at the center of the fixed scroll half 22 spiral where both gas volumes will be expelled. Again, the orbiting scroll half vacuum seal contact surface 29 of the orbiting scroll half 23 does not travel across the boundary formed by the outside diameter of the dynamic orbital vacuum seal groove 26 which allows the dynamic orbital vacuum seal 32 to maintain contact with the orbiting scroll half vacuum seal contact surface 29 to prevent atmospheric pressure from entering the improved oil free scroll vacuum pump 21.

Figure 8B:
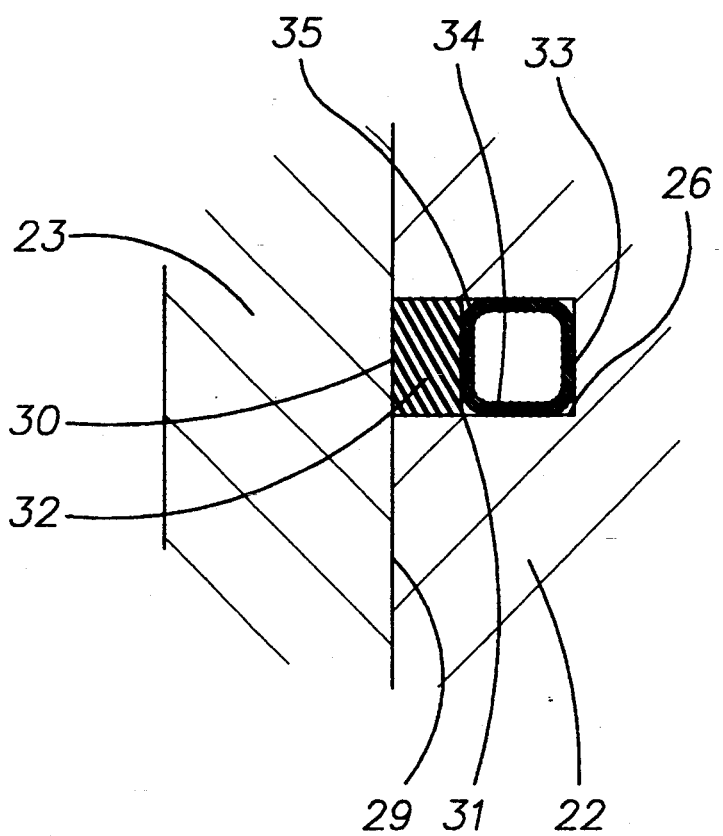
FIG. 8B is a detail view, in cross section, of the seal configuration of FIG. 8A.
Figure 8A:
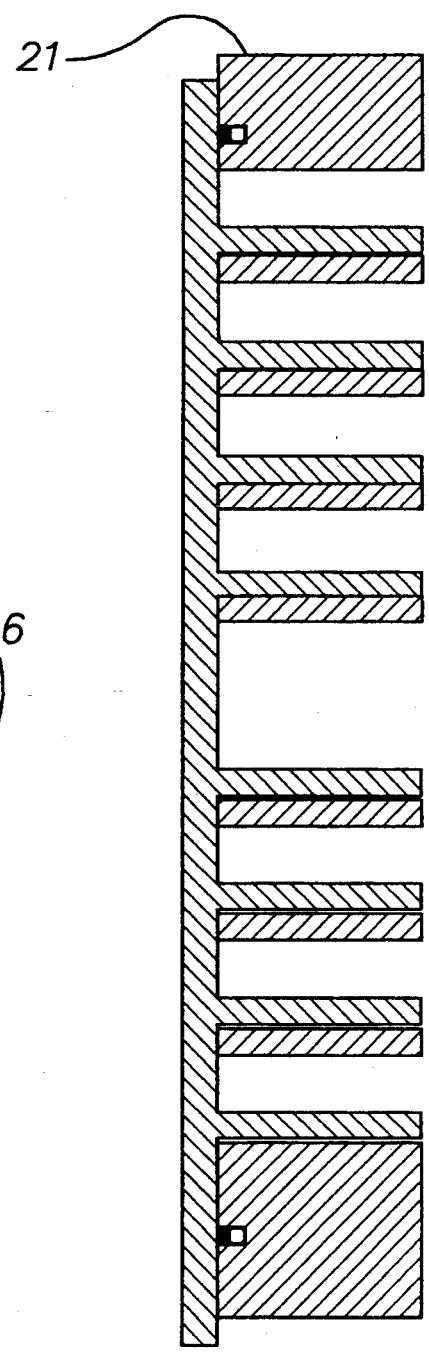
FIG. 8A is a cross-sectional side elevation view taken on line 8—8 of FIG. 7 with an enlarged view of the invention's preferred dynamic orbital vacuum seal configuration.

Referring to FIG. 8A, a cross section of the improved oil free scroll vacuum pump 21 in FIG. 7 is shown with the orbiting scroll half 23 in the bottom most position. The enlarged detail FIG. 8B shows the configuration of the preferred invention dynamic orbital vacuum seal 32 and the elastomer seal loading bladder 33. In this configuration, the dynamic orbital vacuum seal face surface 30 is loaded against the orbiting scroll half vacuum seal contact surface 29 by the pneumatic pressure inside the elastomer seal loading bladder 33 that exerts force against the seal loading bladder inside surface 34 which in turn causes the seal loading bladder outside surface 35 to exert force against the dynamic orbital vacuum seal back surface 31 and the dynamic orbital vacuum seal groove 26. The force inside the elastomer seal loading bladder 33 creates a reliable static vacuum seal between the dynamic orbital vacuum seal back surface 31 and the dynamic orbital vacuum seal groove 26 and an effective dynamic vacuum seal between the dynamic orbital vacuum seal face surface 30 and the orbiting scroll half vacuum seal contact surface 29 of the orbiting scroll half 23. It has been found that the orbital vacuum sealing performance of the dynamic orbital vacuum seal 32 is related to the type of material used to construct said seal. "GYLON BLUE" from Garlock inc. is the preferred material for the purpose of creating the vacuum seal at the time of this application. It is understood that other material may prove adequate or superior for the purpose. The preferred material for construction of the elastomer seal loading bladder 33 is currently fluorocarbon elastomer. Because the bladder is pneumatically actuated, the type of elastomer used for this component relates more to the longevity of the bladder and less to its ability to load said dynamic seal and create said static seal. It is believed that the seal configuration in this figure will improve the performance of the invention's scroll pump when the pump is used as a gas compressor instead of a vacuum pump.

Figure 9B:
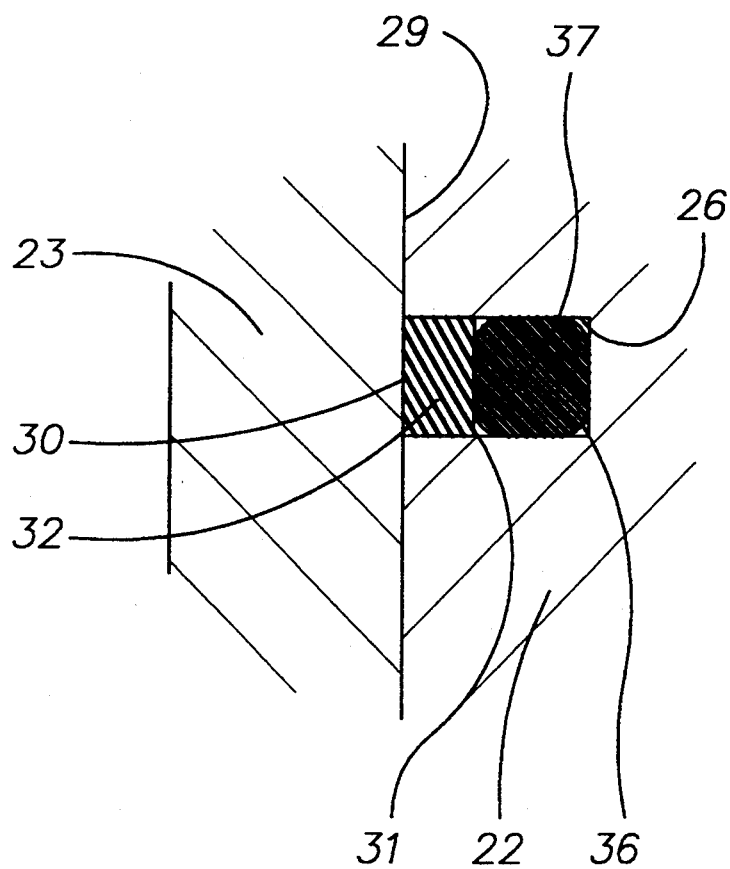
FIG. 9B is a detail view, in cross section, of the seal configuration of FIG. 9A.
Figure 9A:
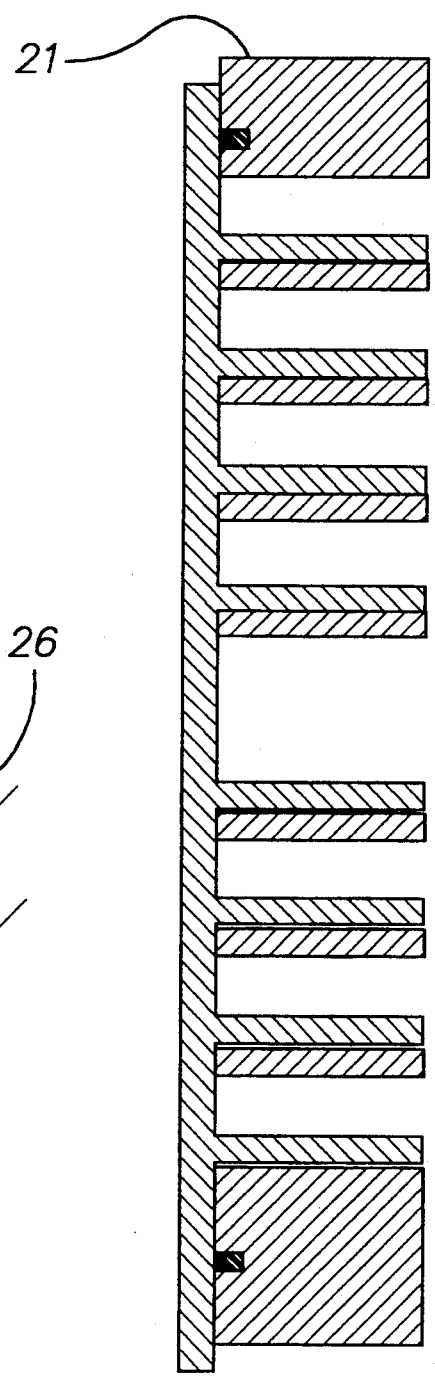
FIG. 9A is the cross-sectional side elevation view with enlarged view of FIG. 8 where the invention's preferred dynamic orbital vacuum seal configuration has been replaced by the invention's alternate dynamic vacuum seal configuration.

Referring to FIG. 9A, a cross section of the improved oil free scroll vacuum pump 21 in FIG. 7 is shown with the orbiting scroll half 23 in the bottom most position. The enlarged detail FIG. 9B shows the configuration of the alternate invention dynamic orbital vacuum seal 32 and the elastomer seal loading ring 37. In this configuration, the dynamic orbital vacuum seal face surface 30 is loaded against the orbiting scroll half vacuum seal contact surface 29 by deformation of the elastomer seal loading ring 37. The deformation exerts force against the dynamic orbital vacuum seal back surface 31 and the dynamic orbital vacuum seal groove 26. The force creates a reliable static vacuum seal groove 26 and an effective dynamic vacuum seal between the dynamic orbital vacuum seal face surface 30 and the orbiting scroll half vacuum seal contact surface 29 of the orbiting scroll half 23. It has been found that the orbital vacuum sealing performance of the dynamic orbital vacuum seal 32 is related to the type of material used to construct the seal. "GYLON BLUE" from Garlock Inc. is the preferred material for the purpose of creating the vacuum seal at the time of this application. The preferred material for construction of the elastomer seal loading ring 37 is currently 70 durometer fluorocarbon elastomer. Because the elastomer is not pneumatically actuated, the type of elastomer used for this component relates to both the longevity of the ring and its ability to load the dynamic seal and create the static seal. It is understood that other material may prove itself to be adequate or superior. We believe that the seal configuration in this figure will improve the performance of the invention scroll pump when the pump is used as a gas compressor instead of a vacuum pump.

Figure 10B:
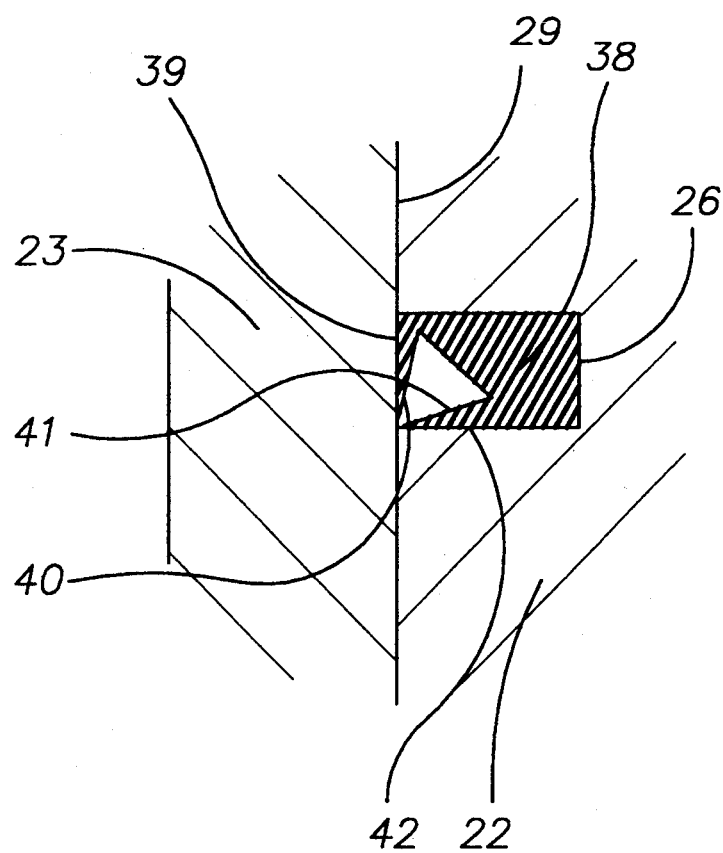
FIG. 10B is a detail view, in cross section, of the seal configuration of FIG. 10A.
Figure 10A:
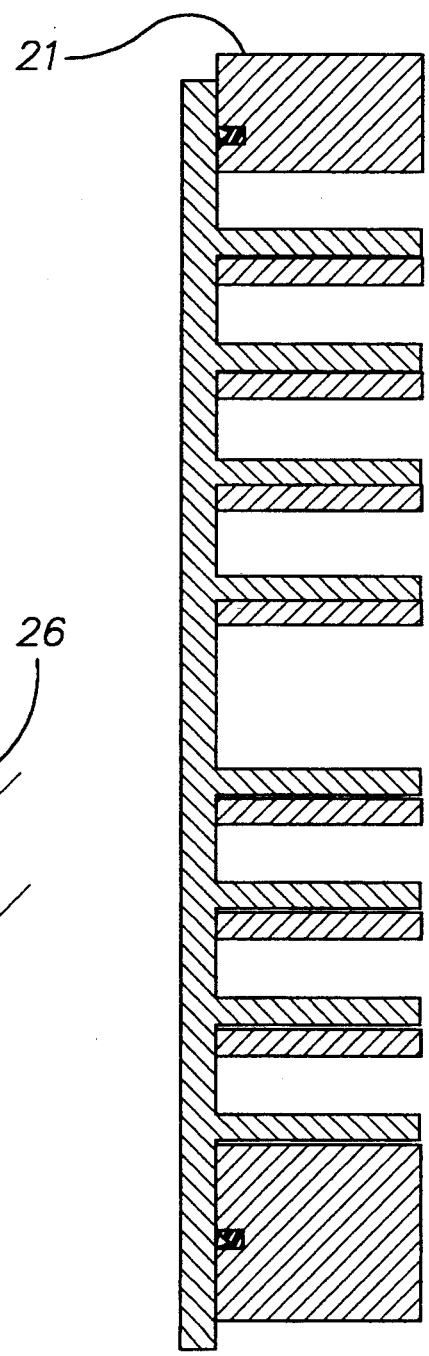
FIG. 10A is the cross-sectional side elevation view with enlarged view of FIG. 8 where the invention's preferred dynamic orbital vacuum seal configuration has been replaced by the invention's alternate delta pressure operated dynamic/static vacuum seal configuration.

Referring to FIG. 10A and 10B, a delta pressure operated dynamic/static orbital vacuum seal 38 configuration is shown. In this configuration the delta pressure operated dynamic/static orbital vacuum seal dynamic face surface 39 and the delta pressure operated dynamic/static orbital vacuum seal static face surface 42 are loaded against their opposite surfaces by difference in pressure between the interior of the pump and the exterior. The delta pressure exerts force against the delta pressure operated dynamic/static orbital vacuum seal dynamic back surface 40 and the delta pressure operated dynamic/static orbital vacuum seal static back surface 41.

Figure 11B:
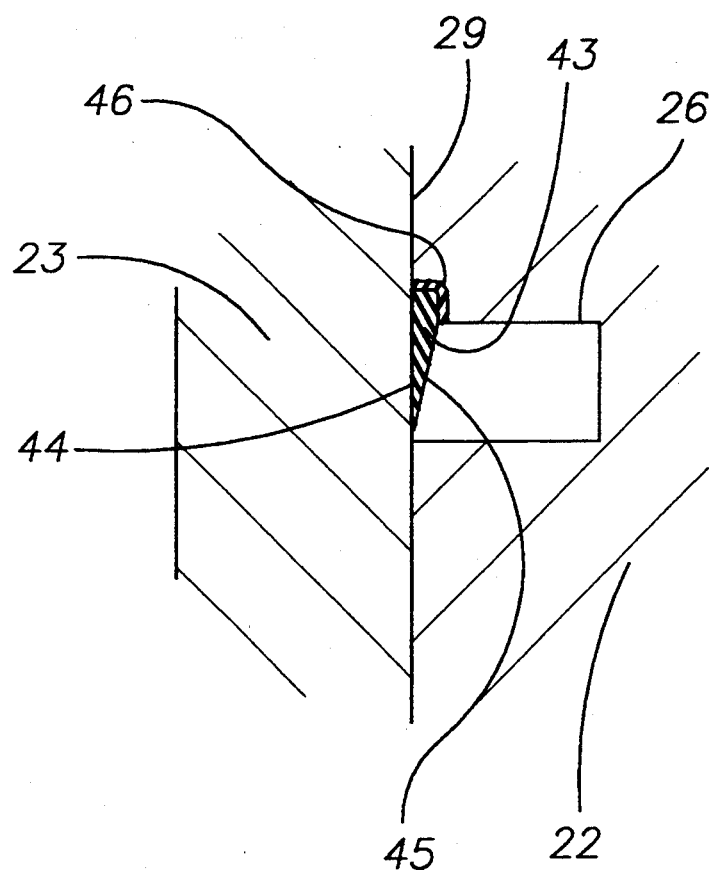
FIG. 11B is a detail view, in cross section, of the seal configuration of FIG. 11A.
Figure 11A:
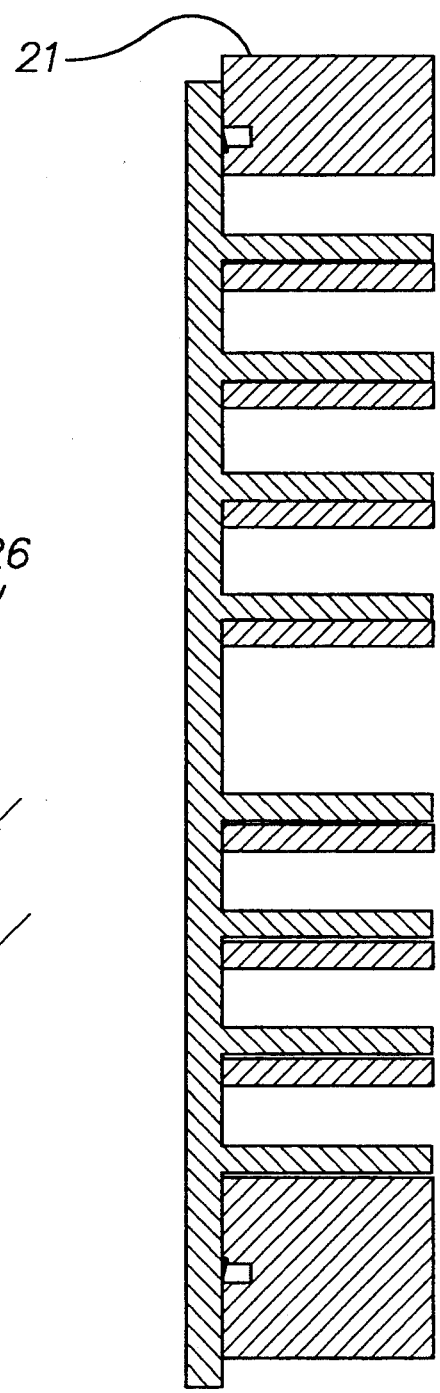
FIG. 11A is the cross-sectional side elevation view with enlarged view of FIG. 8 where the invention's preferred dynamic orbital vacuum seal configuration has been replaced by the invention's alternate delta pressure operated dynamic orbital vacuum seal configuration.

Referring to FIG. 11A and 11B, a delta pressure operated dynamic orbital vacuum seal 43 configuration is shown. In this configuration the delta pressure operated dynamic orbital vacuum seal dynamic face surface 44 is loaded against the opposite surface by difference in pressure between the interior of the pump and the exterior. The delta pressure exerts force against the delta pressure operated dynamic orbital vacuum seal dynamic back surface 45. In this seal configuration a static seal between the seal and the host scroll half is created with a delta pressure operated dynamic orbital vacuum seal bond to host scroll half 46.

Figure 12B:
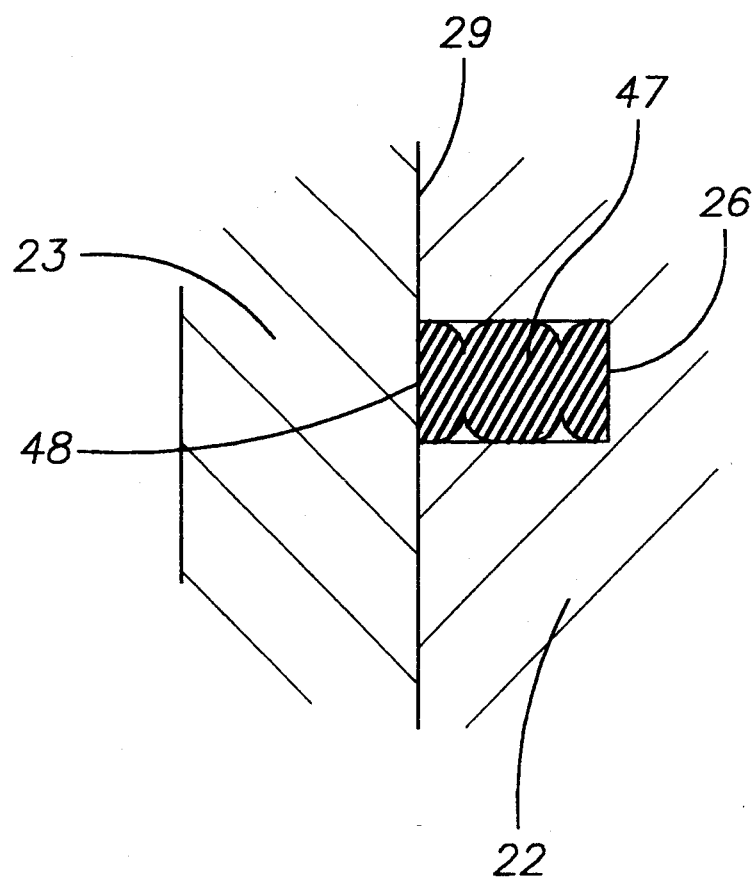
FIG. 12B is a detail view, in cross section, of the seal configuration of FIG. 12A.
Figure 12A:
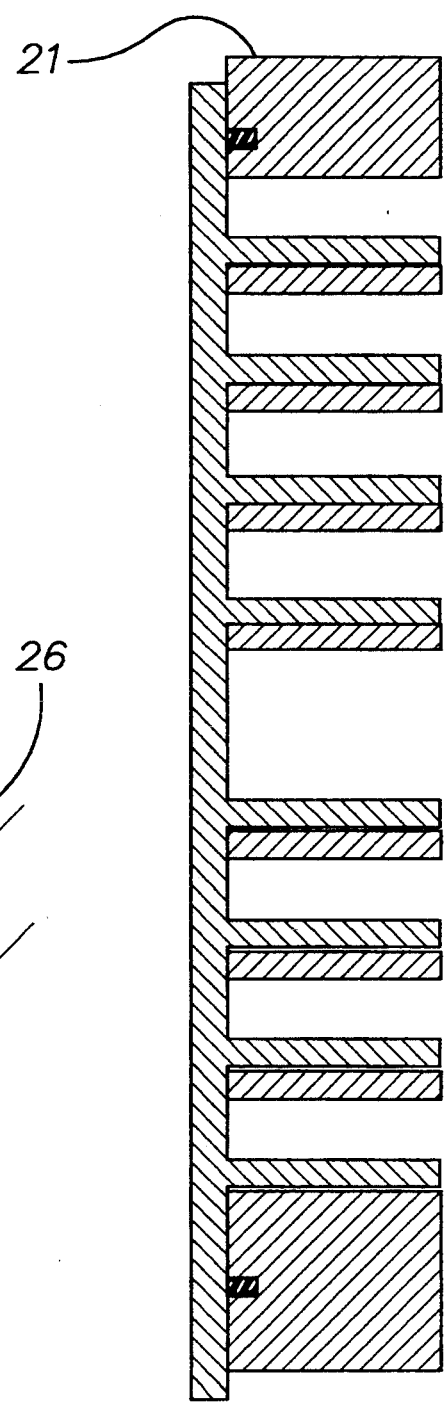
FIG. 12A is the cross-sectional side elevation view with enlarged view of FIG. 8 where the invention's preferred dynamic orbital vacuum seal configuration has been replaced by the invention's alternate compressed elastomer dynamic orbital vacuum seal configuration.

Referring to FIGS. 12A and 12B, a compressed elastomer dynamic orbital vacuum seal 47 configuration is shown. In this configuration the compression of the seal loads the compressed elastomer dynamic orbital vacuum seal face surface 48 to establish the dynamic vacuum seal and creates the static seal contact with the seal groove. It should be noted that the single seal configurations rely on special elastomer seal material that incorporates special material characteristics that give it the ability to withstand the surface speed requirements of the dynamic orbital seal requirement and flexibility to also maintain a static seal with the host scroll half.

We claim:

1. In an oil-free, scroll vacuum-pump comprising a first plate-half having a first, interior, spiral pathway, and a second plate-half having a second, interior, spiral pathway in operative engagement with said first, spiral pathway, at least one of said first plate-half and said second plate-half being capable of orbital motion; an inlet, and an exhaust, whereby, during the orbital motion of said at least one plate-half, a volume of gas is compressed along said spiral pathways until it is exhausted at said exhaust; said first plate-half having a first, annular surface-face, and said second plate-half having a second, annular surface-face for contact against said first, annular surface-face of said first plate-half, wherein the improvement comprises:

said first plate-half having an annular groove formed in said first, annular surface-face, and vacuum-seal means in said annular groove for creating a vacuum seal to prevent ambient air entering into said spiral pathways, said vacuum-seal means in said annular groove comprising an annular, elastomeric, sealing ring;

said annular, elastomeric, sealing ring comprising a cutout formed therein, said cutout being located in said groove closer to said second, annular surface-face of said second plate-half, said cutout being bounded by a first, radially-interior, narrow lip-section which is contact with a section of said annular groove to form a static seal, and a second, narrow lip-section juxtapositioned opposite, and in engagement with, said second, annular surface-face of said second plate-half, to form a dynamic seal, whereby the pressure differential between the interior and exterior of the pump loads said tapering sections against respective surfaces.

2. The oil-free, scroll vacuum-pump according to claim 1, wherein said first plate-half is a fixed plate-half, and said second plate-half is an orbital plate-half.

3. The oil-free, scroll vacuum-pump according to claim 1, wherein said cutout is triangular in shape; said first section tapering to a narrowest portion opposite said second, annular surface-face of said second plate-half in a direction from the interior of said groove toward said second, annular surface-face of said second plate-half.

4. The oil-free, scroll vacuum-pump according to claim 1, wherein said cutout is located in the half of said annular ring lying closer to said second annular surface-face of said second plate-half.

5. The oil-free, scroll vacuum-pump according to claim 1, wherein said cutout is triangular in shape; said second section tapering to a narrowest portion opposite said second, annular surface-face of said second plate-half in a direction from the radially-innermost annular surface forming said groove toward the radially-outermost annular surface forming said groove.

6. The oil-free, scroll vacuum-pump according to claim 5, wherein said cutout is triangular in shape; said first section tapering to a narrowest portion opposite said second, annular surface-face of said second plate-half in a direction from the interior of said groove toward said second, annular surface-face of said second plate-half; said narrowest portion of said first section and said narrowest portion of said second section converging toward each other.

7. In an oil-free, scroll vacuum-pump comprising a first plate-half having a first, interior, spiral pathway, and a second plate-half having a second, interior, spiral pathway in operative engagement with said first, spiral pathway, at least one of said first plate-half and said second plate-half being capable of orbital motion; an inlet, and an exhaust, whereby, during the orbital motion of said at least one plate-half, a volume of gas is compressed along said spiral pathways until it is exhausted at said exhaust; said first plate-half having a first, annular surface-face, and said second plate-half having a second, annular surface-face for contact against said first, annular surface-face of said first plate-half, wherein the improvement comprises:

said first plate-half having an annular groove formed in said first, annular surface-face, and vacuum-seal means in said annular groove for creating a vacuum seal to prevent ambient air entering into said spiral pathways, said vacuum-seal means in said annular groove comprising an annular, elastomeric, sealing ring;

said annular, elastomeric, sealing ring comprising a first, outer, dynamic sealing contact-surface for contact against second, annular surface-face of said second plate-half;

a second, inner tapering surface that tapers to a narrowest portion opposite said second, annular surface-face of said second plate-half in a direction from the radially-innermost annular surface forming said groove toward the radially-outermost annular surface forming said groove;

and an inner peripheral surface-section in contact with, and secured to, a wall section of said groove for providing a static sealing surface.

8. The oil-free, scroll vacuum-pump according to claim 7, wherein said annular ring has a thickness taken in the direction of said groove from the exterior open mouth of said groove towards the interior of said groove, said thickness being relatively much smaller than the width of said groove, whereby the groove is kept at ambient pressure which biases said ring into sealing engagement with respective surfaces.

* * * * *